(12) United States Patent
Richard

(10) Patent No.: US 10,089,748 B2
(45) Date of Patent: Oct. 2, 2018

(54) METHOD FOR IDENTIFYING THE ANISOTROPY OF THE TEXTURE OF A DIGITAL IMAGE

(71) Applicants: UNIVERSITÉ D'AIX-MARSEILLE, Marseille (FR); CENTRE NATIONAL DE LA RECHERCHE SCIENTIFIQUE, Paris (FR)

(72) Inventor: Frédéric Joseph Pierre Richard, Marseille (FR)

(73) Assignees: UNIVERSITÉ D'AIX-MARSEILLE, Marseille (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 15/512,794

(22) PCT Filed: Sep. 17, 2015

(86) PCT No.: PCT/FR2015/052488
§ 371 (c)(1),
(2) Date: Mar. 20, 2017

(87) PCT Pub. No.: WO2016/042269
PCT Pub. Date: Mar. 24, 2016

(65) Prior Publication Data
US 2017/0294025 A1    Oct. 12, 2017

(30) Foreign Application Priority Data
Sep. 19, 2014  (FR) .................................. 14 58886

(51) Int. Cl.
*G09G 5/00*    (2006.01)
*G06T 7/41*    (2017.01)
(Continued)

(52) U.S. Cl.
CPC .............. *G06T 7/41* (2017.01); *G06T 7/0012* (2013.01); *G06T 7/251* (2017.01); *G06T 7/30* (2017.01); *G06T 2207/30068* (2013.01)

(58) Field of Classification Search
CPC ..... G06T 15/04; G06T 11/001; G06T 15/005; G06T 1/60; G09G 5/363
(Continued)

(56) References Cited

U.S. PATENT DOCUMENTS

2004/0252870 A1    12/2004  Reeves et al.
2005/0010106 A1    1/2005   Lang et al.
(Continued)

FOREIGN PATENT DOCUMENTS

WO    WO200569225    7/2005

OTHER PUBLICATIONS

Podsiadlo, P. etc. The development of the modified Hurst orientation transform for the characterization of surface topography of wear particles. Tribology Letters 4 (1998) 215-229 [online], [retrieved on Feb. 2, 2018]. Retrieved from the Internet <URL: https://link.springer.com/content/pdf/10.1023/A:1019188129186.pdf>.*
(Continued)

*Primary Examiner* — Ke Xiao
*Assistant Examiner* — Gordon Liu
(74) *Attorney, Agent, or Firm* — Occhiuti & Rohlicek LLP

(57) ABSTRACT

A method for determining an extent of anistropy of texture of an image in a manner that avoids inaccuracies arising from interpolation.

8 Claims, 1 Drawing Sheet

(51) Int. Cl.
    *G06T 7/00*     (2017.01)
    *G06T 7/30*     (2017.01)
    *G06T 7/246*     (2017.01)

(58) Field of Classification Search
    USPC .......................................................... 345/582
    See application file for complete search history.

(56) References Cited

U.S. PATENT DOCUMENTS

| | | | |
|---|---|---|---|
| 2005/0207650 A1* | 9/2005 | Martin | G06K 9/4647 382/190 |
| 2008/0292194 A1 | 11/2008 | Schmidt et al. | |
| 2010/0303358 A1 | 12/2010 | Acharyya | |
| 2011/0188728 A1 | 8/2011 | Sammak et al. | |
| 2013/0202177 A1 | 8/2013 | Bar-Aviv et al. | |
| 2015/0049170 A1* | 2/2015 | Kapadia | G06T 17/00 348/46 |

OTHER PUBLICATIONS

Chilès, Jean-Paul and Pierre Delfiner, "Geostatistics: Modeling Spatial Uncertainty," John Wiley & Sons, Inc., Hoboken, New Jersey, 2012 (731 pages).

Hall, Peter and Prakash Patil, "Properties of Nonparametric Estimators of Autocovariance for Stationary Random Fields," Probab. Theory Relat. Fields, 99: 399-424 (1994).

P. Podsiadlo et al., "The Development of the Modified Hurst Orientation Transform for the Characterization of Surface Topography of Wear Articles", Tribology Letters, May 1, 1998, pp. 215-229.

Hermine Bierme et al., "Anisotropic Texture Modeling and Applications to Medical Image Analysis", ESAIM: Proceedings, vol. 26, Jan. 1, 2009, pp. 100-122.

Vliet and Verbeek et al., "Estimators for Orientation and Anisotropy in Digitizes Images", Tribology Letters 4, Jan. 1, 1995, pp. 442-450.

Hermine Bierme et al., "Parametric Estimation for Gaussian Operator Scaling Random Fields and Anisotropy Analysis of Bone Radiograph Textures", MICCAI, Jan. 1, 2009, pp. 13-24.

Toyjanova et al., "High Resolution, Large Deformation 3D Traction Force Microscopy", PLOS One, vol. 9, No. 4, Apr. 16, 2014, p. e90976.

Davies, "Introduction to Texture Analysis", Handbook of Texture Analysis.

Chan et al., "Increment-Based Estimators of Fractal Dimension for Two-Dimensional Surface Data", Statistaca Sinica 10 (2000), p. 343-376.

Richard et al., "Statistical Test of Anisotropy for Fractional Brownian Textures. Application to Full-field Digital Mammography", J Math Imaging Vis (2010) 36: 227-240.

Haralick et al., "Textural Features for Image Classification", IEEE Transactions on Systems, Man, and Cybernetics, Nov. 1973.

Roux et al., "Self-Similar Anisotropic Texture Analysis: The Hyperbolic Wavelet Transform Contribution", IEEE Trans. On Image Processing, May 19, 2013.

* cited by examiner

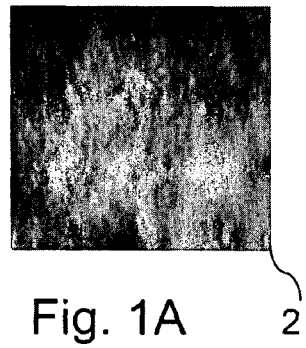
Fig. 1A 2
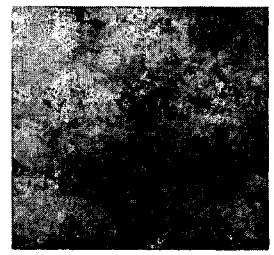
Fig. 1B
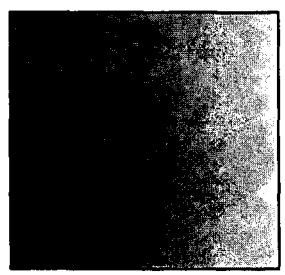
Fig. 1C
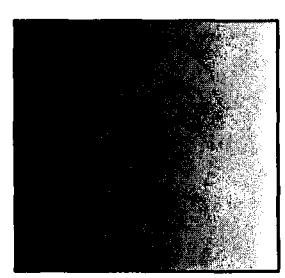
Fig. 1D
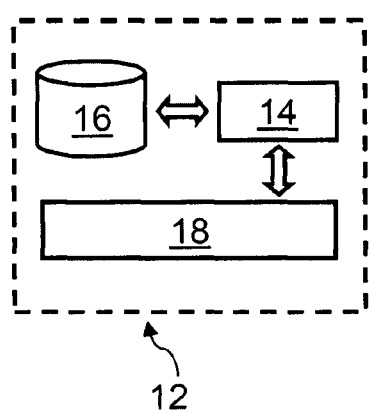
Fig. 2
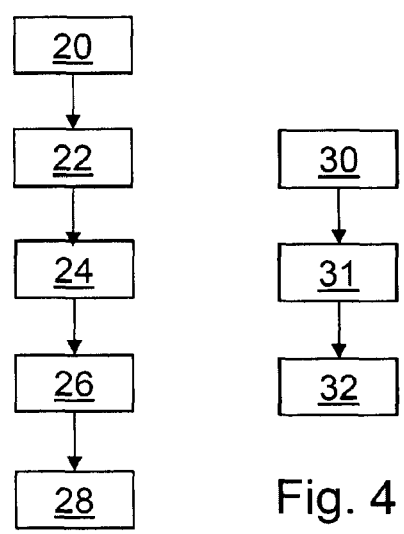
Fig. 3
Fig. 4

METHOD FOR IDENTIFYING THE ANISOTROPY OF THE TEXTURE OF A DIGITAL IMAGE

RELATED APPLICATIONS

This is the national stage under 35 USC 371 of PCT application PCT/FR2015/052488, filed on Sep. 17, 2015, which claims the benefit of the Sep. 19, 2014 priority date of French application 1458886.

FIELD OF INVENTION

The invention concerns methods for identifying anisotropy in the texture of a digital image, classifying digital images according to the anisotropy of their texture, and information storage media and an electronic computers for implementing such methods.

BACKGROUND

Known methods of identifying anisotropy of an image have certain disadvantages. Among these are those that from the projection, by means of a Radon transform, of the pixels of the image in two projection directions that are parallel to the edges of the image. One limitation of this method is that only an anisotropy of the texture oriented in one of these directions can be identified. If the image has an anisotropy oriented in some other direction, for example the direction of a diagonal of the image), then it will not be correctly identified.

Although it is possible to project the image in additional directions to alleviate this problem, this is not desirable. In practice, the digital image is defined as a set of pixels placed on a discrete grid or matrix ("lattice"), that is to say that the pixels have for positions points in the space $\mathbb{Z}^d$. It is not desirable to define projections in other directions of the image because the projected points would no longer belong to the lattice. This makes it necessary to interpolate, from the projected points, the values of the pixels that belong to the lattice. This introduces an error and degrades the reliability of the method.

There is therefore a requirement for a method for identifying, with satisfactory reliability, the anisotropy of the texture of an image in any direction.

SUMMARY

In one aspect, the invention features a method for identifying the anisotropy of the texture of a digital image. In such a method, the transformation includes a rotation and a change of scale of the acquired image. Thereafter, the method also includes the calculation of the p-variations of the transformed image only from the pixels of that image that occupy a position that belongs to the set E. Thanks to this, it is not necessary to interpolate to proceed to the calculation of the p-variations regardless of the angle of the rotation. Dispensing with the need for interpolation in this manner thus improves the identification of the anisotropy.

Moreover, the calculation of the increments $V_{j,k}$ by means of the kernel v makes it possible to characterize correctly the anisotropy of the texture even if the image features a "tendency." As used herein, "tendency" designates a component of the intensity of the pixels of the image distinct from the texture. In practice, "texture" corresponds to variations of intensity of the pixels of the image at short range, i.e., at high frequency, whereas "tendency" corresponds to variations of intensity of the pixels of the image at long range, i.e., at low frequency.

As a general rule tendency is caused by particular conditions of exposure of the device that records the image. For example, a badly calibrated medical X-ray imaging device can generate a tendency in the image, generally with a spatial dependency of polynomial form of degree M equal to 1 or 2. This tendency therefore causes an anisotropy of the image that is not linked to an anisotropy of the texture of the underlying object that appears on the image. It is consequently not desirable to take account of the anisotropy caused by this tendency when seeking to determine the anisotropy of the texture of the image. It is only the anisotropy of the texture of the image and therefore of the underlying object that is of interest. Therefore, thanks to this way of calculating the increments $V_{j,k}$, the anisotropy of the image alone is determined with better reliability.

Embodiments of the invention include may include certain advantages. Among these are that the particular form of the rotations $T_{j,k}$ is simple, thus facilitating their use and promoting faster calculation. Additionally, the Fisher statistical test makes it possible to test the equality of the terms $\beta_j$ effectively and in a simplified manner.

According to another aspect, the invention also concerns a method for automatic classification of digital images as a function of the anisotropy of their texture.

According to another aspect, the invention also concerns an information storage medium that contains instructions for the execution of a method according to the invention.

According to another aspect, the invention also concerns an electronic computer for implementing any of the methods described and claimed herein.

BRIEF DESCRIPTION OF THE DRAWINGS

The invention will be better understood on reading the following description given by way of non-limiting example only and with reference to the drawings, in which:

FIGS. 1A to 1D are diagrams showing digital images having different properties of isotropy or anisotropy;

FIG. 2 is a diagram showing a computing device for characterizing the anisotropy of a digital image from FIGS. 1A to 1D;

FIG. 3 is a flowchart of a method for characterizing the anisotropy of the texture of a digital image;

FIG. 4 is a flowchart of a method for automatic classification of images as a function of the anisotropy of their texture.

In the above figures, the same references are used to designate the same elements.

DETAILED DESCRIPTION

In this description, the following mathematical notation conventions are adopted, unless otherwise indicated:

the range [X,Y] designates the range of all whole numbers greater than or equal to X and less than or equal Y, with X and Y being integers;

a vector A in a space with d dimensions (such as $\mathbb{N}^d$) has coordinates $A_1, A_2, \ldots, A_d$;

$[0,X]^d$ designates the product $[0,X_1] \times [0,X_2] \times \ldots \times [0,X_d]$ where X is a vector of $\mathbb{N}^d$ with coordinates $X_1, X_2, \ldots, X_d$, such that the $i^{th}$ coordinate $U_i$ of a vector U of $[0, X]^d$ belongs to the range $[0,X_i]$, where i is an index greater than or equal to 0 and less than or equal to d; and

|X| is the sum of the components of the vector X, such that |X|=X$_1$+X$_2$ X$_d$.

FIG. 1A shows a digital image 2 that has an anisotropic texture.

In this description, the anisotropy is to be understood as meaning that the properties of the image's texture are not the same in all directions but instead differ depending on the direction in which they are observed.

The texture of a digital image is generally defined as relating to the spatial distribution of intensity variations and/or tonal variations of the pixels forming the digital image. The texture is a manifestation of the Holderian regularity of the image. This concept of "texture" is defined in "Handbook of Texture Analysis," M. Mirmehdi et al., eds., World Scientific, October 2008 in the chapter "Introduction to Texture Analysis" by E. R. Davies, as well as in the section "I. Introduction" of the paper by Robert M. Haralick et al entitled "Textural features for image classification," IEEE Transactions on Systems, Man and Cybernetics; vol. SMC-3, n°6, p. 610-621, November 1973.

Anisotropy of an image can arise from two factors: "texture" and "tendency." "Texture" typically corresponds to the intensity variations of the pixels at short range, i.e., at high frequency; "tendency" relates to intensity variations of the pixels at longer range, i.e., at low frequency.

The texture, and in particular, the texture's anisotropy, is of particular interest for characterizing images that represent biological tissue, such as a mammogram image 2. In such an image, the anisotropic character of an image's texture indicate the presence or risk of developing cancerous cells within that tissue.

FIGS. 1B to 1D show other examples of images of the type that are common when inspecting a mammogram. FIG. 1B shows an image having isotropic texture. FIGS. 1C and 1D respectively show images the texture of which is isotropic and anisotropic and each of which includes an anisotropy caused by a second order polynomial tendency. In these images, that tendency is oriented in the horizontal direction.

The image 2 is formed from a plurality of pixels. Each pixel is associated with a pixel intensity value and a position $\mathbb{Z}^d$ in space, where d is a natural integer greater than or equal to 2 that represents the dimension of the image 2. In the particular example described herein, d=2.

The pixels of the image 2 are thus disposed in space in the manner of a matrix ("lattice") in the space $\mathbb{Z}^d$. The resolution of the image is preferably the same along all d axes of the image. Hereinafter, the set of the possible positions of the pixels of the image 2 is denoted [0,N]$^d$, where N is a vector that codes the size of the image and whose components are strictly positive natural integers belonging to $\mathbb{N}^d$. This notation signifies that the coordinates n$_1$, n$_2$, . . . , n$_d$ of the position n of a pixel of the image respectively belong to the set [0,N$_1$], [0,N$_2$], . . . , [0,N$_d$], where N$_1$, N$_2$, . . . N$_d$ are the coordinates of N. In the particular example, the image 2 is a square with dimensions (N$_1$+1)·(N$_2$+1), where N$_1$+1=N$_2$+1 and N$_1$+1 is the length of a side of that square expressed as a number of pixels. In this example, the image 2 is an area of interest that has been extracted from an image of larger size. In general, the sides of the image 2 have a length greater than or equal to 50 pixels, 100 pixels, or 500 pixels.

In this example, the luminous intensity of the pixels is gray-scale encoded on 8 bits. The values of pixel intensity are integers in the range [0,255].

FIG. 2 shows a device 12 for identifying and characterizing the anisotropy of an image's texture. The device 12 indicates whether an image 2 is isotropic or not. In some practices, the device 12 also quantifies, or characterizes, the extent of the anisotropy.

The device 12 includes: a programmable electronic computer 14, an information-storage medium 16, and a digital-image acquisition interface 18 that enables the acquisition of the image 2. The digital image 2 typically comes from an electronic imaging device, which in the illustrated embodiment is a radiography device. The computer 14 executes the instructions stored on the medium 16 for executing the method described below in connection with FIGS. 3 and 4. This method identifies and characterizes image anisotropy using certain operations.

In example described herein, the image 2 is modeled as the statistical realization of an intrinsic random Gaussian field. This means that the intensity value associated with each pixel of the image 2 corresponds to the realization of a Gaussian random variable Z. The intrinsic random Gaussian field is explained in more detail in: J. P. Chilès et al. "*Geostatistics: Modeling Spatial Uncertainty,*" J. Wiley, 2$^{nd}$ edition, 2012.

Z[p] denotes an intensity value associated with a pixel in the image 2 whose position is given by the vector p. An orthonomic frame of reference is defined in $\mathbb{Z}^d$ as having, as its origin, the null vector (0)$^d$.

An embodiment of the method for automatic characterization of the anisotropy of the texture is described next with reference to the flowchart in FIG. 3 and with the aid of FIGS. 1 and 2.

In an acquisition step 20, the image 2 is automatically acquired via the interface 18 and stored, for example, on the medium 16. Hereinafter this image 2 is designated by the notation "I".

In this example, with dimension d=2, a square matrix $\underline{Z}$ with dimensions (N$_1$+1)·(N$_2$+1) models the normalized image 2. The coefficients of this matrix $\underline{Z}$ are the Z[p] corresponding to the intensity of the pixels at position p. The components of the vector p give the position of that coefficient in the matrix $\underline{Z}$. For example, Z[p] is the coefficient of the p$_1$th row and the p$_2$$^{th}$ column of $\underline{Z}$, where p$_1$ and p$_2$ are the coordinates of the position p in [0,N]$^2$.

In a transformation step 22 that follows, geometrical transformations of the image 2 are applied to obtain a series of transformed images I$_{j,k}$. These transformations include modifications T$_{j,k}$ of the image 2, each of which includes a rotation by an angle α$_j$ and a change of scale by a scale factor γ$_k$. T$_{j,k}$(I) denotes the image obtained after the application of the modification T$_{j,k}$ to the acquired image I.

Each modification T$_{j,k}$ is uniquely characterized by a vector u$_{jk}$ of the space $\mathbb{Z}^2\setminus\{(0,0)\}$, such that α$_j$=arg(u$_{jk}$) and γ$_k$=|u$_{jk}$|$^2$. The space $\mathbb{Z}^2\setminus\{(0,0)\}$ is the space $\mathbb{Z}^2$ without the point with coordinates (0,0).

The indices "j" and "k" are integers that respectively and uniquely identify the angle α$_j$ and the factor γ$_k$. To simplify the notation, hereinafter "rotation j" and "change of scale k" respectively refer to a rotation by angle α$_j$ and to a change of scale by the factor γ$_k$.

The rotation j rotates each of the pixels of the image 2 by the angle α$_j$ from a starting position to an arrival position about the same point or the same predetermined axis. That point or that rotation axis typically passes through the geometrical center of the image. In the illustrated embodiment, rotation is relative to the geometrical center of the image, which is the barycenter of the positions of all of the pixels of the image, each weighted by a coefficient of the same value.

The change of scale k enlarges or reduces the image by a homothetic factor $\gamma_k$. In the examples given below, the homothetic center is the geometrical center of the image.

These modifications $T_{j,k}$ are applied for at least two and preferably at least three or four different angles $\alpha_j$. The different values of the angles as are advantageously distributed as uniformly as possible between 0° and 180° while complying with the constraint that the vector $u_{jk}$ must belong to the space $\mathbb{Z}^2\backslash\{(0,0)\}$. To limit the number of calculations to be performed, the number of different values for the angle $\alpha_j$ is generally chosen so as not to be too large. In typical embodiments, this number is made less than twenty. In others, it is less than ten. A good compromise is to choose four different values for the angle $\alpha_j$. For each angle $\alpha_j$, modifications $T_{j,k}$ are applied for at least two and preferably at least three, four, or five different changes of scale $\gamma_k$.

The values of the factor $\gamma_k$ are, for example, greater than or equal to 1 and less than or equal to $10^2$ or $8^2$ or $4^2$. The different values of the factor $\gamma_k$ are preferably distributed as uniformly as possible across the chosen range of values.

Some practices of the method include choosing the rotation angles $\alpha_j$ as a function of the horizontal and vertical directions of the image 2. For example, to perform two rotations j1 and j2, one chooses values $\alpha_{j1}=90°$ and $\alpha_{j2}=180°$, where j1 and j2 are particular values of the index j. By convention, the angles are expressed relative to the horizontal axis of the image 2.

In the two-dimensional examples described herein, the modifications $T_{j,k}$ are given by:

$$T_{j,k} = \gamma_k \begin{pmatrix} \cos(\alpha_j) & -\sin(\alpha_j) \\ \sin(\alpha_j) & \cos(\alpha_j) \end{pmatrix}$$

The transformation step 22 includes calculating K-increments for each of the transformed images $T_{j,k}(I)$. This calculation includes filtering that is intended to limit the tendencies of polynomial form of order strictly less than K. In particular, for each image $T_{j,k}(I)$, a filter is applied to make it possible to calculate the K-increment $V_{j,k}$ of that image $T_{j,k}(I)$. It is the K-increment of that image $T_{j,k}(I)$ that constitutes the transformed image $I_{j,k}$. The K-increment $V_{j,k}$ of that image is not calculated for all the points of the image $T_{j,k}(I)$, but only for some of those points, as explained later.

The K-increment is defined in more detail for example in: J. P. Chilès et al. "*Geostatistics: Modeling Spatial Uncertainty*," J. Wiley, $2^{nd}$ edition, 2012, the contents of which are herein incorporated by reference.

The filtering is performed with a convolution kernel denoted "v" to apply linear filtering. Hereinafter "filter v" designates this convolution kernel.

The filter v is defined over the set $[0,L]^d$. A characteristic polynomial $Q_v(z)$ characterizes filter v as follows:

$$\forall z \in \mathbb{R}^d, Q_v(z) = \sum_{p \in [0,L]^d} v[p] z^p$$

In this example, the filter v designates a matrix, and v[p] designates a particular scalar value of this filter for the vector p, where p is a vector of $[0,L]^d$. This value of v[p] is zero if the value p does not belong to $[0,L]^d$. In an equivalent manner, the filter v is also said to feature limited support on $[0,L]^d$. This filter v is distinct from the null function, which has a null value v[b] for any value of the vector p. Here the notation $z^p$ designates the monomial $z_1^{p1} \cdot z_2^{p2} \cdot \ldots \cdot z_d^{pd}$.

The parameters of the filter v are therefore set by the $[0,N]^d$ vector L. As a general rule, the vector L is chosen so as to be contained in the image I. Values of L are therefore preferably adopted that satisfy, for all i from 1 to d, the relation $L_i \ll N_i$. For example, $L_i$ is less than 10 times or 100 times less than $N_i$.

Moreover, the filter v is such that its characteristic polynomial $Q_v(z)$ satisfies the following condition:

$$\forall a \in [0, K]^d \text{ such that } |a| \le K \text{ then}$$

$$\frac{\partial^{|a|} Q_v}{\partial z_1^{a_1} \ldots \partial z_d^{a_d}}(1, \ldots, 1) = 0$$

where the constant K is a non-zero natural integer and $\partial^{|a|}Q_v/\partial z_1^{a_1} \ldots \partial z_d^{a_d}$ is the partial derivative of the polynomial $Q_v(z)$ with respect to the components of the vector z, the symbol $\partial z_i^{a_i}$ indicating a differentiation of the polynomial $Q_v(z)$ of order $a_i$ with respect to the variable $z_i$, where $z_i$ designates the $i^{th}$ component of the vector z and $a_i$ designates the $i^{th}$ component of the vector a, i being an integer index greater than or equal to 0 and less than or equal to d.

The filtering of the image $T_{j,k}(I)$ by the filter v makes it possible to eliminate the effect of the tendency on the subsequent calculations of the method when the latter takes the form of a polynomial of order M, provided that the value of the constant K is chosen so that $K \ge M+1$ if d is less than or equal to 4, and $K \ge M/2+d/4$ if d>4.

The K-increments of the image $T_{j,k}(I)$, denoted $V_{j,k}$, are then calculated as follows using the filter v:

$$V_{j,k}[m] = \sum_{p \in [0,L]^d} v[p] \cdot Z[m - T_{j,k} \cdot p]$$

where:
$V_{j,k}[m]$ is a K-increment calculated on the image $T_{j,k}(I)$ for the pixel at position m, with m being a vector belonging to a set E defined hereinafter;
the product $T_{j,k} \cdot p$ corresponds to the application of the modification $T_{j,k}$ to the pixel p of the image I and expresses the coordinates in $\mathbb{Z}^d$, after application of the modification $T_{j,k}$, of the pixel initially at position p in the image I,
v[p] is the value of the filter v for the value of p.

For each image $T_{j,k}(I)$, the K-increment is calculated only on those pixels of the image $T_{j,k}(I)$ whose positions belong to a set E. The set E contains only positions that belong to the image I, and, regardless of the modification $T_{j,k}$ applied, occupy a position that already exists in the image I after application of this modification $T_{j,k}$. The number of positions that belong to the set E is denoted $n_E$.

Moreover, for any position m belonging to the set E, the pixels at position "m–$T_{j,k} \cdot p$" occupy a position contained in the image I.

Accordingly, the quadratic variations are calculated only on the points of the transformed image for which no interpolation is necessary. It is therefore possible to have recourse to rotations j by any angle, in contrast to the situation with projections. In fact, if a projection is applied in a diagonal direction of the image, for example, projected points will have a position that does not belong to the set $[0,N]^d$. In other words, they are no longer part of the matrix. It is therefore necessary to have recourse to an interpolation to determine the intensity value associated with points that belong to that matrix. This introduces an approximation and therefore the possibility of an error. The reliability of the method is increased by the modification $T_{j,k}$ and thereafter the selection of the points of the set E.

In the illustrated example, the filtering is effected within the same formula as the application of the modification $T_{j,k}$.

With this choice of the constant K, the filtering produces the increments $V_{j,k}[m]$ of order K. This filtering makes it possible to avoid taking into account an anisotropy of the image caused by the tendency, and to consider only the anisotropy of the texture of the underlying image, which in the present example, is an image of the mammary tissue. This results in improved reliability of the characterization method.

The constant K must therefore be chosen as described above as a function of the nature of the tendency present in the image 2. Typically, in the case of a mammogram, the polynomial degree M of the tendency is less than or equal to 2. Step 22 thus includes acquiring a value of the vector L and a value of the constant K.

$$v[p] = (-1)^{|p|} \times C_{L_1}^{p_1} \times \ldots \times C_{L_d}^{p_d} = (-1)^{|p|} \times \prod_{i=1}^{d} \frac{L_i!}{p_i! \times (L_i - p_i)!}$$

In this example, the filter v is chosen as follows: if the vector p belongs to $[0,L]^d$ and $v[p]=0$ otherwise, where the terms $C_L^p$ designate binomial coefficients.

With this particular filter, the condition previously expressed on the characteristic polynomial $Q_v(z)$ is satisfied if $K=|L|-1$. Also, the value of K is deduced from the value of the parameter L that has been acquired.

Then, in this particular instance, the filtering of the image $T_{j,k}(I)$ by the filter v makes it possible to eliminate the effect of the "tendency" if the latter has a polynomial form of order M provided that the parameter L is chosen such that $|L|=M+2$ if d is less than or equal to 4, and $|L|=M/2+d/4+1$ if $d>4$.

In this two-dimensional example, with $d=2$, the vector L has two components, $L_1$ and $L_2$. To eliminate a tendency of order $M=2$, $L_1$ and $L_2$ must be chosen such that $|L|$ is equal to four. The preferable choice is $L_1=4$ and $L_2=0$. In fact, by choosing values for the coordinates of the vector "L" sufficiently far apart, the filter can be made to have greater directional sensitivity. This greater sensitivity allows it to react in a more marked manner and therefore to filter more effectively those variations that are oriented in a particular direction. In contrast, a filter for which $L_1=2$ and $L_2=2$ would be less sensitive to a directional signal and would therefore be a less effective filter.

During step 22, for each different value of j and k, the computer 14 successively applies the modification $T_{j,k}$ to the image 2 to obtain the image $T_{j,k}(I)$ and then applies the filter v to the image $T_{j,k}(I)$ to obtain the transformed image $I_{j,k}$.

Then, during a step 24, for each image $I_{j,k}$, the p-variation $W_{j,k}$ associated with that image $I_{j,k}$ is calculated. The p-variation concept is well known to the person skilled in the art in the field of probability and statistics. It is given by the following formula:

$$W_{j,k}[m] = \frac{1}{n_E} \sum_{m \in E} (V_{j,k}[m])^q$$

In the above equation, the symbol "q" has been used instead of the symbol "p" that is conventionally used in this equation. This is to prevent any confusion with the symbol "p" used herein to designate the position of a pixel. In this example, a particular form of the p-variations is used, namely the "quadratic variations" or "2-variations" for which $q=2$. The quadratic variation $W_{j,k}$ of the image $I_{j,k}$ is therefore calculated as follows from the K-increments calculated after filtering during step 22:

$$W_{j,k}[m] = \frac{1}{n_E} \sum_{m \in E} (V_{j,k}[m])^2$$

These quadratic variations $W_{j,k}$ contain information that is important for the identification of the anisotropy. This information is extracted beginning with step 26.

The next step is an analysis step 26 during which a covariance analysis, including a statistical regression, is effected on all the variations $W_{j,k}$ calculated for each of the images $I_{j,k}$. This is carried out in order to interpolate the value of the Hurst exponent H of the image I and a term $\beta_j$. The statistical regression is defined by the following equation:

$$\log(|W_{j,k}|) = \log(|u_{jk}|^2) \cdot H + \beta_j + \varepsilon_{j,k},$$

where H is the Hurst exponent of the image I, which is a physical magnitude independent of the rotations of the image; $\beta_j$ is a quantity that does not depend on the change of scale k, this being analogous to an intercept parameter of the regression, except that it depends on the rotations j; and $\varepsilon_{j,k}$ is an error term of the regression, the statistical properties of which are predetermined and fixed by the user. In some practices, the user chooses the error terms $\varepsilon_{j,k}$ to be Gaussian random variables that are correlated with one another.

A number $n_j$ of terms $\beta_j$ is therefore obtained, $n_j$ being the number of different rotations applied to the image I.

For example, if the two rotations j1 and j2 described above suffice, the regression is effected on the basis of all the quadratic variations calculated for j1 and j2. This results in two terms $\beta_{j1}$ and $\beta_{j2}$.

The analysis includes estimating the covariance of the quadratic variations, for example by a standard method applicable to stationary fields. The parameters are estimated using a generalized least-squares criterion. A method of this kind is described for example in: P. Hall et al., "*Properties of nonparametric estimators of autocovariance for stationary random fields*," Probability Theory and Related Fields, vol. 99:3, p. 399-424, 1994.

At this stage, the anisotropy is detected by testing the equality of the terms with one another to within a predetermined error margin.

In fact, each of the terms $\beta_j$ encapsulates information relating to the texture in the direction inherent to the rotation j. If all the terms $\beta_j$ are equal to one another, this means that the texture does not depend on the orientation. This, of course, is what "isotropic" means. Otherwise, if the terms $\beta_j$ are not equal to one another, then the texture is anisotropic. During a testing step 28, the equality of the terms $\beta_j$ with one another to within a predefined value is tested. The image 2 can then be identified as being isotropic if an equality of this kind is found. Otherwise, it is identified as being anisotropic.

A suitable test for use in the testing step 28 is a Fisher statistical test to test the validity of the following null hypothesis: "$\forall j \in [1,n_j]$, $\beta_j = \beta$," where $\beta$ is a term that does not depend either on the rotations j or on the changes of scale k. This null hypothesis is tested against the alternative hypothesis "$\exists j_1, j_2$ such that $\beta_{j1} \neq \beta_{j2}$." In a typical embodiment, the predetermined error margin is fixed by a confidence range of 95% or 99%.

The p-value of the Fisher test amounts to a digital signature indicating the degree of anisotropy of the image. This makes it possible to assess whether the image is of low or high anisotropy. This, in turn, makes it possible to classify the image 2 relative to a reference anisotropy value or relative to other images. Typical practices thus include automatically collecting the test's p-value.

FIG. 4's flowchart describes an application of the method for automatically classifying images 2 relative to one another as a function of their anisotropy.

An initial acquisition step 30 includes automatically acquiring a plurality of images 2. A subsequent calculation step 31 includes automatically calculating a digital signal that is characteristic of the extent of the image's anisotropy. This is carried out using methods discussed above in connection with steps 20 to 28. In the illustrated embodiment, this signature is the p-value returned by the Fisher test at the end of the testing step 28. The p-value of the test is typically between zero and one, with the value "one" representing the lowest order of anisotropy and the value "zero" representing the highest order of anisotropy.

A classification step 32 that follows includes automatically classifying the acquired images with respect to one another as a function of their anisotropy using the signatures calculated during the calculating step 31. The images are classified by increasing order of anisotropy, for example. A suitable classifier is a classifying algorithm based on neural networks or a support vector machine. However, other classifiers are possible.

In some embodiments, the pixels of the image 2 have other intensity values. The intensity value of each pixel may be a real value. Or it may be greater than 256. In some cases, the image 2 is encoded in color. In such cases, the color image is separated into a plurality of monochrome images, each of which corresponds to a colorimetric channel that composes the color image. The method is then applied separately for each of these monochrome images.

Although the embodiments described have shown a square image 2, the image need not be square. For example, in the two-dimension case, where d=2, the image can be rectangular or even trapezoidal. When the image does not have a regular shape, the "horizontal" and "vertical" directions are replaced by reference directions that are better suited to the image's geometry. For example, in the case of a triangular image, the base and the height of the triangle are useful reference directions. For higher-dimensional cases, the image 2 can be a hypercube of dimension d.

Although only mammograms have been shown, the image 2 can be something other than a mammogram. For example, it may be a bone-tissue image. The anisotropy of the texture of the image would then provide information on the presence of bone pathologies such as osteoporosis.

Other, wider fields of application may be envisaged, such as other types of biological tissues, air or satellite images, geological images, or images of materials. As a general rule, the method applies to any type of irregular and textured image such as an image obtained from any electronic imaging device.

Other modifications may be used. For example, with dimension d=3 the modifications $T_{j,k}$ perform a rotation j about a given rotation axis and a change of scale k in a given direction of the image. The following modifications may be used, for example:

$$T_{j,k} = \begin{pmatrix} \cos(\alpha_j) & -\sin(\alpha_j) & 0 \\ \sin(\alpha_j) & \cos(\alpha_j) & 0 \\ 0 & 0 & \gamma_k \end{pmatrix}, \text{ or}$$

$$\begin{pmatrix} \cos(\alpha_j) & 0 & -\sin(\alpha_j) \\ 0 & \gamma_k & 0 \\ \sin(\alpha_j) & 0 & \cos(\alpha_j) \end{pmatrix}, \text{ or}$$

$$\begin{pmatrix} \gamma_k & 0 & 0 \\ 0 & \cos(\alpha_j) & -\sin(\alpha_j) \\ 0 & \sin(\alpha_j) & \cos(\alpha_j) \end{pmatrix}.$$

The above modifications $T_{j,k}$ perform a rotation about an axis and a change of scale in a direction that is not parallel to that axis.

The values of the angle $\alpha_j$ may be different. Values of the angle $\alpha_j$ are preferably chosen that do not necessitate interpolations.

The values of the factor $\gamma_k$ may be different.

Alternatively, the rotation and the change of scale are not applied at the same time.

Other filters v can be used to calculate the K-increments. For example, it is quite possible to calculate the K-increments using any filter that has a convolution kernel that is defined as being equal to the convolution product of any convolution kernel v1, and a convolution kernel v2 equal to the kernel v described above.

In the particular case where the kernel v1 is an identity matrix, the filter v described above is used again. Conversely, choosing a kernel v1 different from the identity matrix makes it possible to construct a large number of filters that are different from the filters v described above but that are nevertheless eminently suitable for calculating the K-increments.

The filtering may be done differently during step 22. In particular, the transformation and the filtering are not necessarily applied simultaneously, but rather in separate formulas that are applied in separate steps.

In alternative practices, all the transformations $T_{j,k}$ are first applied to the image I, after which the filters are applied to each of the images $T_{j,k}(I)$.

The value of K may be different. In particular, with the filter v chosen in the example, if the image I has no tendency, in which case M=0, then |L|=2 will preferably be adopted or, if d>4, |L|=1+d/4.

Alternatively, a plurality of filters $v_i$ are applied to each image $T_{j,k}(I)$ during step 22. The number of different filters $v_i$ applied to a given image $T_{j,k}(I)$ is denoted $n_i$. In this case, the transformed image obtained by applying the filter v to the image $T_{j,k}(I)$ is denoted $I_{i,j,k}$ and $V_{i,j,k}[m]$ denotes the K-increment of that image at the position m in that image, where "i" is an index that uniquely identifies the filter $v_i$ applied. In such cases, the index "i" is different from the index "i" used before as a mute variable, notably with reference to the partial derivative of the polynomial $Q_v(z)$. In fact, it is then possible to calculate a plurality of quadratic variations for each image $T_{j,k}(I)$, one for each filter $v_i$ applied to that image $T_{j,k}(I)$. $W_{i,j,k}$ therefore denotes the quadratic variation calculated for the image $I_{i,j,k}$.

To achieve this, in some practices, step 22 includes an operation of selecting the filters $v_i$, for example from a predefined library of filters.

The quadratic variations $W_{i,j,k}$ are then calculated during step 24 using the following relation:

$$W_{i,j,k}[m] = \frac{1}{n_E} \sum_{m \in E} (V_{i,j,k}[m])^2$$

During step 26, the regression is then effected as follows, taking account of the $n_i$ filters applied: $\log(|W_{i,j,k}|) = \log(|u_{jk}|^2) \cdot H + \beta_{i,j} + \in_{i,j,k}$, where: $\beta_{i,j}$ is the term $\beta_j$ associated with the filter $v_i$; and $\varepsilon_{i,j,k}$ is the error term $\varepsilon_{j,k}$ associated with the filter $v_i$.

This results in obtaining a number $n_b$ of terms $\beta_{i,j}$, where $n_b = n_j \cdot n_i$, $n_j$ is the number of different rotations applied to the image I. During step 28, the null hypothesis of the Fisher test is formulated as follows: "$\forall j \in [1, n_j]$, $\beta_{i,j} = \beta_i$," where $\beta_i$ is a term that does not depend on the rotations j or on the changes of scale k but does depend on the filters $v_i$ used.

If a plurality of filters $v_i$ are used, the numbers of filters $v_i$ applied can vary from one image $T_{j,k}(I)$ to another, always provided that to a filter i there correspond at least two rotations j and, for each of those rotations j, at least two changes of scale k.

It is also possible to carry out step 28 differently, for example by implementing the Fisher test differently. This might be implemented by choosing a different estimator or with other confidence ranges.

Alternatively, it is possible to use other ways to test the equality of the terms during step 28. For example, one can test whether all the terms $\beta_j$ are equal to one another to within 2% or to within 5%. If so, then the texture is termed isotropic. Otherwise the texture is termed anisotropic. This test is then not a true statistical test. Instead, it is a test of strict equality.

According to another example, the equality test is performed by using a Student statistical test to test inequality between the terms $\beta_j$. For example, it is possible to compare all the terms $\beta_j$ two by two to determine if there exists j1, j2 such that $\beta_{j1} > \beta_{j2}$.

It is also possible to perform the classification during step 32 differently. For example, is possible to choose the order of classification of the images differently.

Having described the invention, and a preferred embodiment thereof, what is claimed as new, and secured by Letters Patent is:

1. A method comprising identifying anisotropy of texture of a digital image, wherein identifying said anisotropy comprises acquiring an acquired image I formed from pixels, wherein each pixel is associated with a luminous intensity and with a position in a space $\mathbb{Z}^d$, wherein d is a natural integer greater than or equal to two; automatically transforming said acquired image to obtain a transformed image $I_{j,k}$, wherein automatically transforming includes applying a modification $T_{j,k}$ to said acquired image, wherein said modification causes each pixel of said acquired image to rotate by an angle $\alpha_j$ from one position to another about a point or an axis, wherein said modification enlarges or reduces said acquired image by a factor $\gamma_k$, wherein $u_{jk}$ is a vector of $\mathbb{N}^2 \setminus \{(0,0)\}$ that completely characterizes said modification $T_{j,k}$, wherein said indices j and k respectively and uniquely identify said angle $\alpha_j$ and said factor $\gamma_k$, wherein $\alpha_j = \arg(u_{jk})$ and $\gamma_k = |u_{jk}|^2$, wherein, for d=2, said modification $T_{j,k}$ takes the form $$T_{j,k} = \gamma_k \begin{pmatrix} \cos(\alpha_j) & -\sin(\alpha_j) \\ \sin(\alpha_j) & \cos(\alpha_j) \end{pmatrix}$$

wherein, for d=3, said modification takes one of the following matrix forms or a composition of one of said following matrix forms:

$$T_{j,k} = \begin{pmatrix} \cos(\alpha_j) & -\sin(\alpha_j) & 0 \\ \sin(\alpha_j) & \cos(\alpha_j) & 0 \\ 0 & 0 & \gamma_k \end{pmatrix}, \text{ or}$$

$$\begin{pmatrix} \cos(\alpha_j) & 0 & -\sin(\alpha_j) \\ 0 & \gamma_k & 0 \\ \sin(\alpha_j) & 0 & \cos(\alpha_j) \end{pmatrix}, \text{ or}$$

$$\begin{pmatrix} \gamma_k & 0 & 0 \\ 0 & \cos(\alpha_j) & -\sin(\alpha_j) \\ 0 & \sin(\alpha_j) & \cos(\alpha_j) \end{pmatrix},$$

wherein said transformed image is obtained by multiplying coordinates of position of each pixel by said modification $T_{j,k}$, and, for each image to which a modification $T_{j,k}$ has been applied, calculating a K-increment $V_{j,k}[m]$ for each pixel at a position m of said transformed image, said K-increment being calculated by application of a convolution kernel v by means of the following formula:

$$V_{j,k}[m] = \sum_{p \in [0,L]^d} v[p] \cdot Z[m - T_{j,k} \cdot p]$$

wherein $T_{j,k} \cdot p$ corresponds to application of said modification $T_{j,k}$ to a pixel that was initially at the position p in the acquired image I; wherein p is a d-dimensional position vector having components p1, p2, . . . pd, wherein said convolution kernel v performs linear filtering having a characteristic polynomial $Q_v(z)$ and a finite support $[0,L]^d$, wherein v[p] is the value of the convolution kernel v for the position p, wherein said characteristic polynomial $Q_v(z)$ is defined by:

$$\forall z \in \mathbb{R}^d, Q_v(z) = \sum_{p \in [0,L]^d} v[p] z^p$$

wherein said characteristic polynomial satisfies the following condition:

$$\forall a \in [0, K]^d \text{ such that } |a| \leq K \text{ then}$$

$$\frac{\partial^{|a|} Q_v}{\partial z_1^{a_1} \ldots \partial z_d^{a_d}}(1, \ldots, 1) = 0$$

wherein L is a vector acquired from $[0, N]^d$ that sets the parameters of the kernel v; wherein N is a vector belonging to $\mathbb{N}^d$ that codes the size of the image and the components of which are strictly positive natural integers; wherein K is an acquired non-zero natural integer; wherein z a vector with components $z_1$, $z_2, \ldots z_d$; $z^p$ that designates the monomial $z_1^{p1} \cdot z_2^{p2} \cdot \ldots \cdot z_d^{pd}$; wherein $\partial^{|a|}Q_v/\partial z_1^{a1} \ldots \partial z_d^{ad}$ is the partial derivative of the polynomial $Q_v(z)$ with respect to the components of the vector z, wherein $\partial z_i^{ai}$ indicates differentiation of $Q_v(z)$ of order $a_i$ with respect to the variable $z_i$, wherein $z_i$ designates an $i^{th}$ component of said vector z and $a_i$ designates an $i^{th}$ component of said vector a, wherein i is an integer index greater than or equal to 0 and less than or equal to d, wherein calculation of said K-increments is based on only the pixels of the image that occupy a position m belonging to a set E, wherein said set E includes only positions m that exist already in said acquired image I and that, regardless of said modification $T_{j,k}$, following application of said modification $T_{j,k}$, occupy a position that also exists already in said acquired image I and for which said position "m−$T_{j,k}$·p" occupies a position that also exists already in said acquired image I; wherein said transformed image $I_{j,k}$ is obtained following the calculation of said K-increment including only pixels whose positions are in the set E, wherein automatically transforming said acquired image I to obtain a transformed image $I_{j,k}$ is executed with at least two different angles $\alpha_j$ and, for each angle $\alpha_j$, with at least two different factors $\gamma_k$, so as to obtain at least four different transformed images $I_{j,k}$; calculating, for each different transformed image $I_{j,k}$, a p-variation $W_{j,k}$ of said transformed image from said calculated K-increments; estimating the terms $\beta_j$ of the statistical regression $\log(|W_{j,k}|)=\log(|u_{jk}|^2) \cdot H+\beta_j+\varepsilon_{j,k}$, where H is the Hurst exponent of the acquired image I and $\varepsilon_{j,k}$ is an error term of the regression, the statistical properties of which are predetermined; testing equality of said terms $\beta_j$ relative to one another to within a predetermined error margin, and identifying texture of said acquired image I being identified as isotropic if equality is found following said test and identifying said texture as anisotropic otherwise.

2. The method of claim 1, wherein automatically transforming said acquired image to obtain a transformed image $I_{j,k}$ comprises using a kernel v that is equal to the convolution product of any convolution kernel with the kernel defined as follows:

$$v[p] = (-1)^{|p|} \times C_{L_1}^{p_1} \times \ldots \times C_{L_d}^{p_d} = (-1)^{|p|} \times \prod_{i=1}^{d} \frac{L_i!}{p_i! \times (L_i - p_i)!}$$

if the vector p belongs to $[0,L]^d$ and $v[p]=0$ otherwise, where the terms $C^p_L$, designate binomial coefficients, K then being equal to $K=|L|-1$, wherein $L_i$ is the $i^{th}$ component of vector L.

3. The method of claim 1, wherein calculating, for each different transformed image $I_{j,k}$, a p-variation $W_{j,k}$ of said transformed image from said calculated K-increments comprises calculating p-variations that are quadratic variations in accordance with the following formula:

$$W_{j,k}[m] = \frac{1}{n_E} \sum_{m \in E} (V_{j,k}[m])^q$$

wherein q=2 and wherein $n_E$ is the number of positions that belong to the set E.

4. The method of claim 1, wherein testing equality of said terms $\beta_j$ relative to one another comprises testing using a Fisher statistical test.

5. The method as claimed in claim 4, wherein estimating the terms $\beta_j$ of the statistical regression includes automatically calculating the p-value of the statistical test for quantifying the degree of anisotropy of the acquired image I.

6. The method of claim 5, further comprising automatically classifying digital images as a function of the anisotropy of their texture, said method comprising acquiring a plurality of images, each formed of a plurality of pixels, for each of the acquired images, automatically calculating their respective degrees of anisotropy using the method from claim 5, and classifying said acquired digital images by means of an automatic classifier as a function of the degree of anisotropy calculated for each of said images.

7. A tangible and non-transitory computer-readable information storage medium having encoded thereon instructions for the execution of a method recited in claim 1 on an electronic computer.

8. An apparatus comprising an electronic computer configured to execute the method recited in claim 1.

\* \* \* \* \*